(12) United States Patent
Petin et al.

(10) Patent No.: US 6,637,837 B2
(45) Date of Patent: Oct. 28, 2003

(54) VACUUM BOOSTER AIR INTAKE VIA ENGINE COMPARTMENT BREATHER PASSAGE

(75) Inventors: Bernard Petin, Soully (FR); Patrick T. MacLellan, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 12 days.

(21) Appl. No.: 10/028,239

(22) Filed: Dec. 20, 2001

(65) Prior Publication Data

US 2003/0117014 A1 Jun. 26, 2003

(51) Int. Cl.$^7$ .............................. F16J 15/50; B60T 8/44
(52) U.S. Cl. ...................................... 303/114.3; 74/18.2
(58) Field of Search .............................. 91/369, 376 R; 303/114.1, 114.3; 74/18.2, 608, 609

(56) References Cited

U.S. PATENT DOCUMENTS

| | | | |
|---|---|---|---|
| 4,932,275 A | | 6/1990 | Bischoff et al. |
| 5,115,719 A | * | 5/1992 | Endo .......................... 91/376 R |
| 6,481,330 B1 | * | 11/2002 | Jakobi et al. ............. 91/376 R |

FOREIGN PATENT DOCUMENTS

DE      195 23 309      6/1995

* cited by examiner

*Primary Examiner*—Christopher P. Schwartz
(74) *Attorney, Agent, or Firm*—Scott A. McBain

(57) ABSTRACT

The problem of providing air from a vehicle engine compartment to a breather port of a vacuum booster mounted on a wall separating the engine compartment from the passenger compartment is solved by adapting the wall to provide an air passage, when the rear wall of the booster is bearing against the wall.

20 Claims, 3 Drawing Sheets

VACUUM BOOSTER AIR INTAKE VIA ENGINE COMPARTMENT BREATHER PASSAGE

TECHNICAL FIELD OF THE INVENTION

This invention relates to brake systems for vehicles, and more particularly to brake boosters for such systems.

BACKGROUND OF THE INVENTION

A typical brake system for a vehicle includes a device known as a brake booster, which is used to amplify the force applied directly to a brake pedal by an operator of the vehicle. The booster is typically mounted outside of the passenger compartment in the engine compartment on a firewall, or dashboard, forming the front wall of the passenger compartment. A push rod extends from the booster through an opening in the front wall for connection with a brake pedal assembly located within the passenger compartment. A flexible boot or a sliding seal is provided around the push rod for environmentally sealing the hole in the front wall while allowing movement of the push rod by the brake pedal.

The booster is mounted in this fashion because it must draw in and expel a volume of air through a breather port surrounding the push rod, as the brake pedal is depressed and released. This drawing in and expulsion of air through the breather port unavoidably generates noise that would be objectionable to passengers in the vehicle, if the booster were mounted within the passenger compartment.

Because the breather port surrounding the push rod is located on the side of the booster closest to the front wall of the passenger compartment, some provision must be made to allow air to flow between the booster and the front wall, in order for the air around the booster to reach the breather port.

In some prior booster mounting arrangements, a mounting adapter is provided between the booster and the front wall of the passenger compartment. The adapter includes a ventilation port open to the engine compartment to provide airflow through the adapter to and from the breather port of the booster. U.S. Pat. No. 4,932,275 to Bischoff, et al, illustrates this approach.

Providing an adapter, as taught by Bischoff, significantly increases the distance that booster protrudes into the engine compartment, however, thereby consuming space could be used for other components. The adapter also undesirably increases fabrication and installation cost. Using an adapter also cantilevers the booster farther away from the front wall, which often requires that the front wall be reinforced, adding even more undesirable cost and weight to the vehicle.

In another prior approach, the housing of the booster, on the side of the booster adjacent the front wall of the passenger compartment is formed to provide an air channel, such that when the booster is mounted on the wall, air can flow through the channel from the engine compartment to the booster breather port. This approach solves some of the problems associated with using an adapter, as described above, but the length of the booster is undesirably increased to allow room for the channel. German patent application DE 195 23 309 A1 discloses this approach.

What is needed, therefore, is an improved apparatus and method for mounting a brake booster in a manner that provides a solution to one or more of the problems described above.

SUMMARY OF THE INVENTION

Our invention provides such an improved method and apparatus for mounting a brake booster on a wall, by adapting the wall to provide an air passage for fluid communication from a breather port of the booster to air surrounding the booster, when the rear surface of the booster is bearing against the wall.

One form of our invention provides an apparatus for mounting a brake booster on a wall, where the booster has a push rod extending from a rear surface of the booster through a hole in the wall, and a breather port surrounding the push rod. The apparatus includes a mounting surface of the wall, disposed about the hole in the wall, and adapted for receiving the rear surface of the booster. The wall further includes an air passage in the wall adapted for providing fluid communication from the breather port to air surrounding the booster, when the rear surface of the booster is bearing against the mounting surface. The apparatus may also include a seal disposed between the push rod and the wall for resisting airflow through the wall via either the hole or the air passage.

In one form of our invention, the wall includes a front and a rear surface thereof, with the mounting surface comprising a portion of the front side of the wall and the air passage comprising a channel in the wall. The channel has an inside surface thereof extending below and contiguous with the front surface of the wall. The channel may be provided by deforming a portion of the wall in a direction away from where the booster would be mounted, if the booster were mounted on the mounting surface.

The wall may include a tubular recessed segment thereof recessed below the front surface and contiguously connected thereto, with the hole disposed in the recessed segment. The recessed area may be adapted to receive a seal between the push rod and wall for resisting airflow through the hole. The seal may a lip seal adapted for sliding movement of the pushrod through the seal.

In another form of an apparatus according to our invention, the wall includes a front and a rear surface thereof, with the mounting surface comprising a first portion of the front side of the wall, including the hole, and raised above a second portion of the front side of the wall. The first portion and second portions of the front side of the wall are connected contiguously by a tubular portion of the wall, and the air passage is defined by a breather hole extending through the tubular section of the wall. The apparatus may also include a seal between the rear surface of the wall and the pushrod. The seal may be a lip seal around the push rod, with the wall including a lip seal support having a surface thereof extending from and contiguous with the rear surface of the wall, and having a second hole for passage of the push rod.

Our invention also provides a method for mounting a brake booster on a wall, where the booster has a push rod extending from a rear surface of the booster through a hole in the wall, and the booster also has a breather port surrounding the push rod. The wall is adapted to provide a mounting surface of the wall disposed about the hole in the wall for receiving the rear surface of the booster, and to provide an air passage for fluid communication from the breather port to air surrounding the booster, when the rear surface of the booster is bearing against the mounting surface. The method may further include sealing the push rod to the wall, in a manner resisting airflow through the wall via either the hole or the air passage.

The wall may be further adapted to include a front and a rear surface thereof, with the mounting surface comprising a portion of the front side of the wall and the air passage comprising a channel in the wall, with the channel having an inside surface thereof extending below and contiguous with the front surface of the wall. The channel may be formed by deforming a portion of the wall in a direction away from the booster, if the booster were mounted on the mounting surface. The wall may also be adapted to include a tubular recessed segment thereof recessed below the front surface and contiguously connected thereto with the hole disposed in the recessed segment. The recessed area may be further adapted to receive a seal between the push rod and wall for resisting airflow through the hole. The seal may be a lip seal adapted for sliding movement of the pushrod through the seal.

In another form of a method according to our invention, the wall includes a front and a rear surface thereof, and is adapted such that the mounting surface comprises a first portion of the front side of the wall including the hole and raised above a second portion of the front side of the wall. The first portion and second portions of the front side of the wall are connected contiguously by a tubular portion of the wall, and the air passage is defined by a hole extending through the tubular section of the wall. The method may further include providing a seal between the rear surface of the wall and the pushrod. The seal may include a lip seal around the push rod, with the wall being adapted to include a lip seal support having a surface thereof extending from and contiguous with the rear surface of the wall, and having a second hole for passage of the push rod.

Our invention may be readily adapted for use with prior brake boosters. Our invention does not require an adapter, or special adaptations of the booster housing, as was the case in prior booster mounting approaches. Cost and weight are therefore reduced. Because our invention does not rely on adapters or special configurations of the booster, which may be proprietary to a particular booster manufacturer, a vehicle manufacturer using our invention can utilize boosters from a variety of manufacturers, without fear of being locked in to a particular booster supplier.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being. defined by the appended claims and equivalents thereof.

DETAILED DESCRIPTION OF THE PRESENTLY PREFERRED EMBODIMENTS

Figure 1:
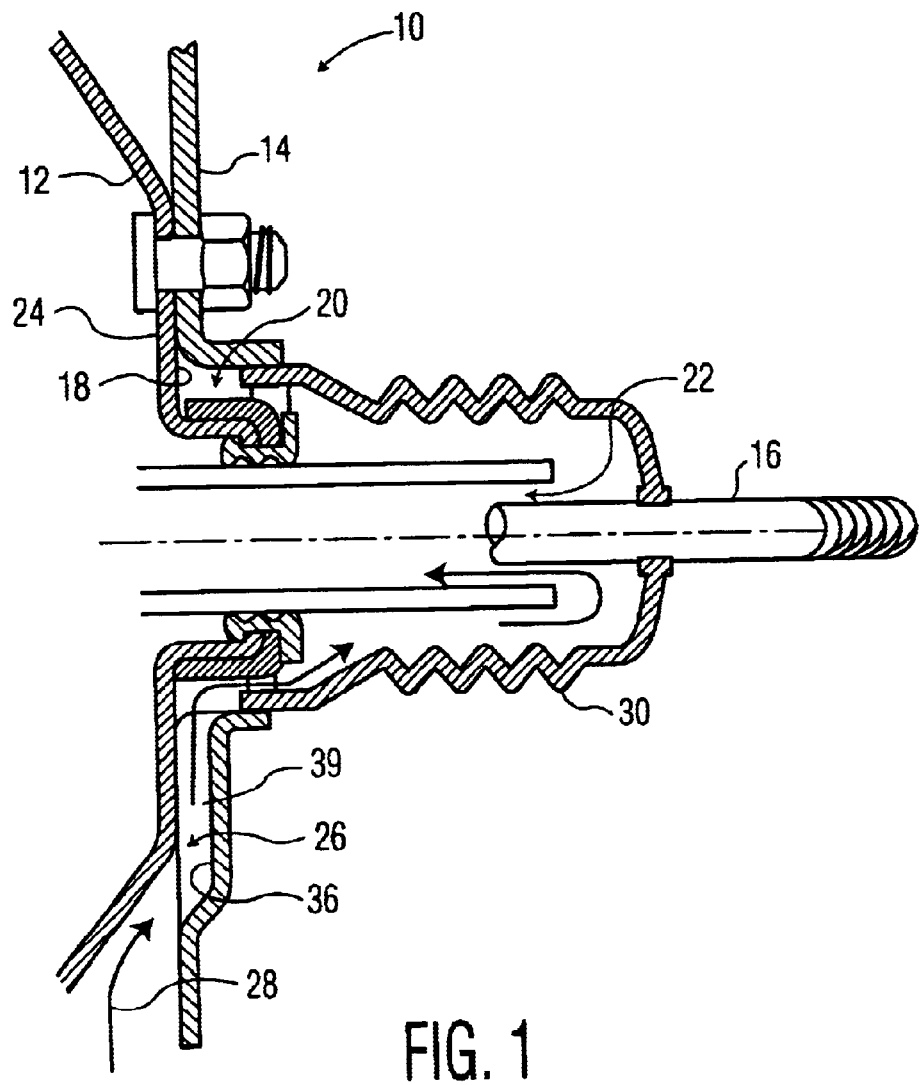
FIG. 1 is partial cross section of a brake booster mounted to a wall having a breather air channel formed in the wall, in accordance with our invention.
Figure 2:
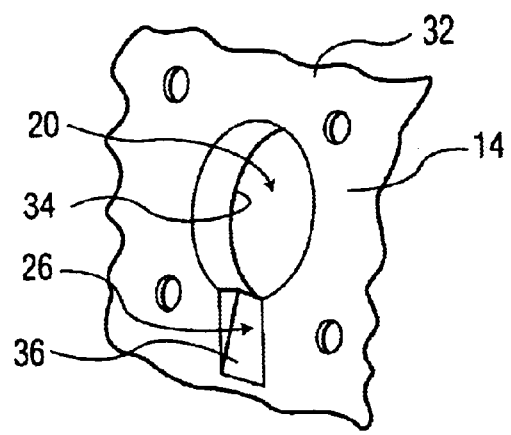
FIG. 2 is an isometric representation of the air channel of FIG. 1.

FIG. 1 depicts an apparatus 10 for mounting a brake booster 12 on a wall 14. The booster 12 includes a push rod 16 extending from a rear surface 18 of the booster 12, and through a hole 20 in the wall 14. The booster 12 also has an annular shaped breather port 22 surrounding the push rod 16. The wall 14 includes a mounting surface 24 disposed about the hole 20 in the wall 14, and adapted for receiving the rear surface 18 of the booster 12. The wall 14 also includes an air passage 26 for providing fluid communication from the breather port 22 to air surrounding the booster 12, as indicated by arrows 28, when the rear surface 18 of the booster 12 is bearing against the mounting surface 24. FIG. 2 shows an isometric view of the air passage 26 in the wall 14.

A seal, in the form of an extendible rubber boot 30, is provided between the push rod 16 and the wall 14, directs air from the air passage 26 into the breather port 22, and resists airflow and noise from passing through the wall 14 via either the hole 20 or the air passage 26.

In the apparatus 10 shown in FIGS. 1 & 2, the wall 14 includes a front surface 32, and a rear surface 34, with the mounting surface 24 comprising a portion of the front side 32 of the wall 14, and the air passage 26 comprising a channel 36 in the wall 14. The channel 36 has an inside surface 39 thereof extending below and contiguous with the front surface 32 of the wall 14. The channel 36, as depicted in FIGS. 1 & 2 is provided by deforming a portion of the wall 14 in a direction away from the booster 12. The channel 36 may alternatively be formed by machining the channel 36 into the wall 14, or by fabricating the wall 14 from multiple parts.

Figure 3:
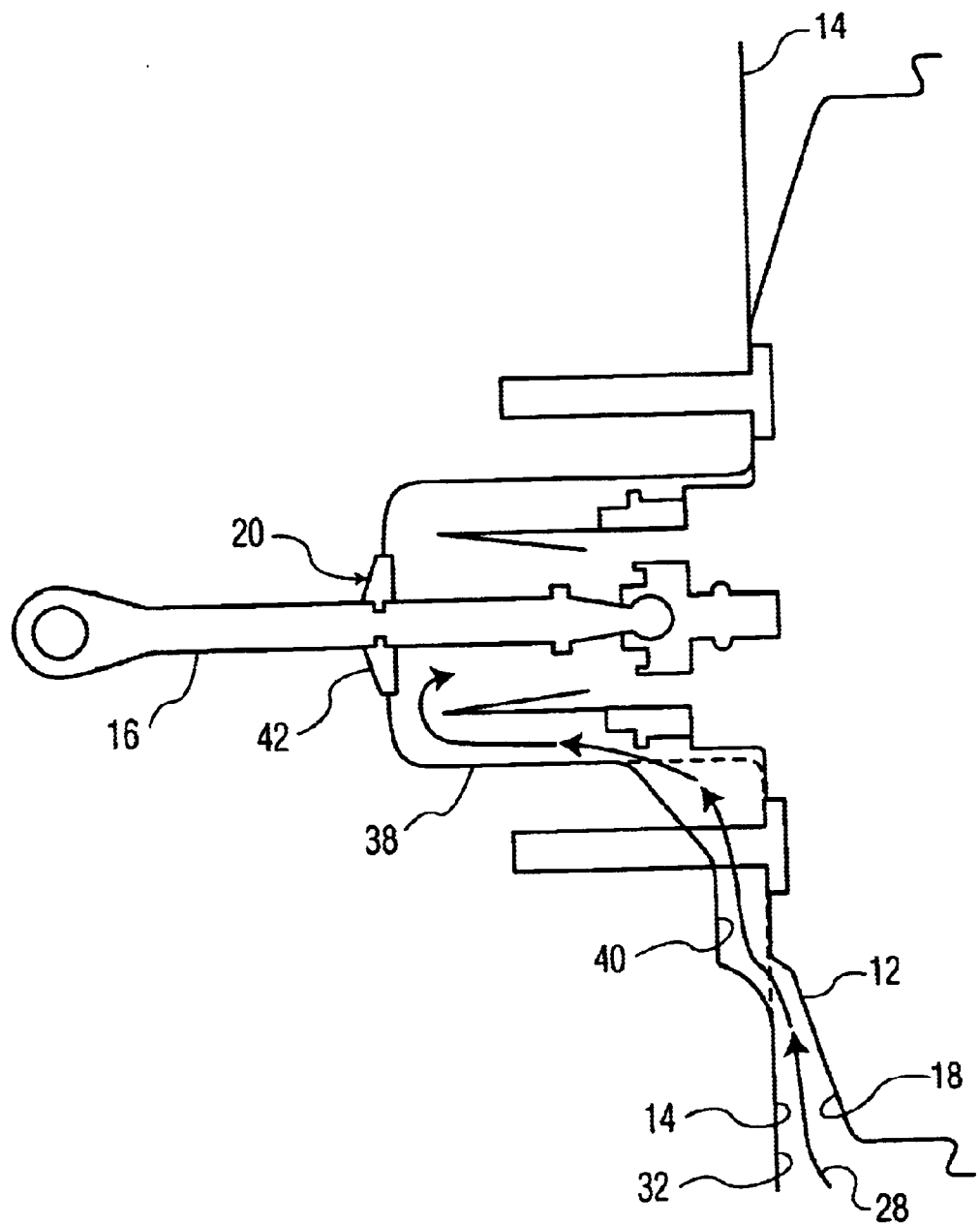
FIG. 3 is a partial cross section of a first alternate embodiment of our invention, having a booster mounted on a wall having a tubular segment of the wall recessed below and contiguously connected to a front surface of the wall, with the front surface and tubular segment including a breather air channel.

FIG. 3 shows a first alternate embodiment wherein the wall 14 includes a tubular segment 38 thereof, recessed below the front surface 32 and contiguously connected thereto, with the hole 20 disposed in the recessed tubular segment 38. The recessed segment 38 is adapted to receive a seal 42 between the push rod 16 and wall 14 for resisting airflow through the hole 20. The seal 42 is a lip seal adapted for sliding movement of the pushrod 16 through the seal 42. The wall 14 is adapted to form an air channel 40, to allow a flow of air 28 between the front surface 32 of the wall 14 and the rear surface 18 of the booster 12.

Figure 4:
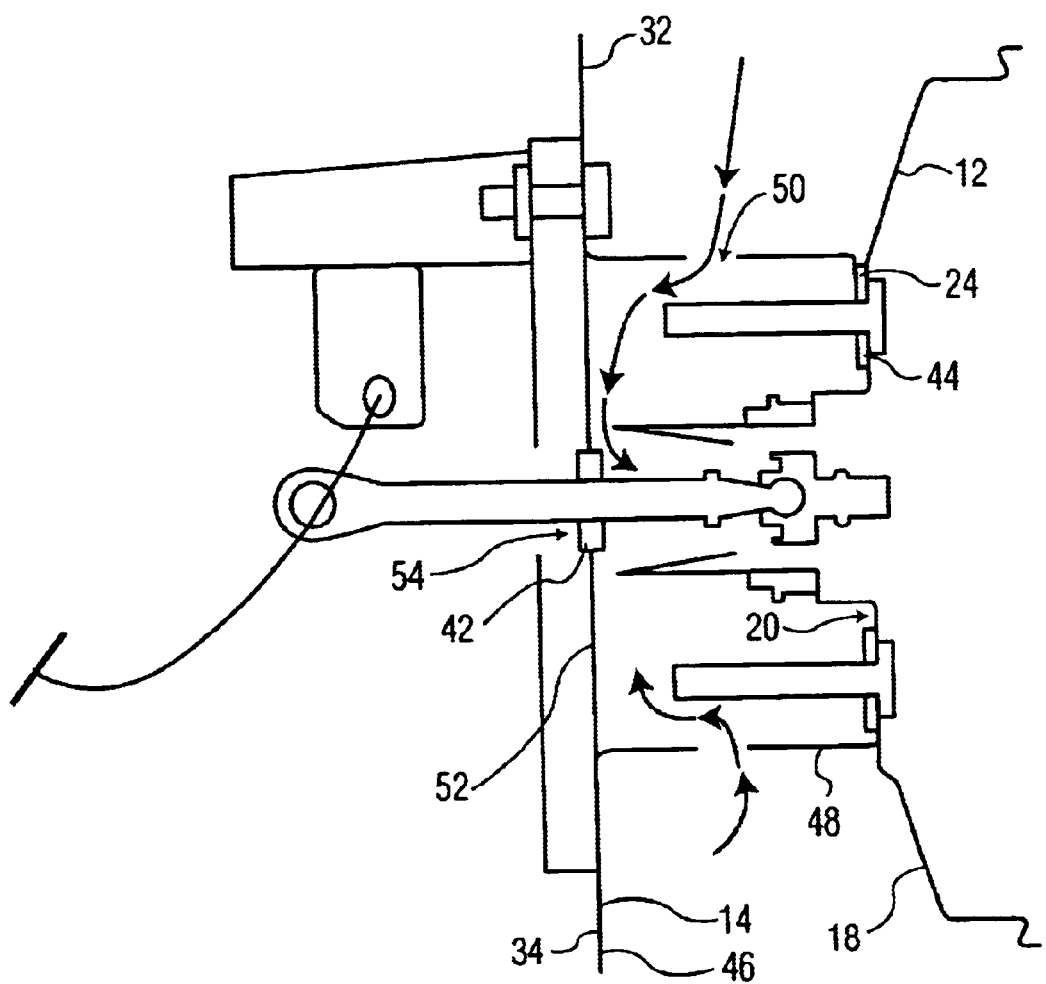
FIG. 4 is a partial cross section of a second alternate embodiment of our invention, having a booster mounted on a raised tubular portion of a wall, and a breather hole extending through the raised tubular portion.

FIG. 4 shows a second alternate embodiment of an apparatus 10 according to our invention. The wall 14 includes a front 32 and a rear surface 34 thereof, with the mounting surface 24 comprising a first portion 44 of the front side 32 of the wall 14, including the hole 20, and raised above a second portion 46 of the front side of the wall 14. The first and second portions 44, 46 of the front side 32 of the wall 14, are connected contiguously by a tubular portion 48 of the wall 14. The air passage is defined by a breather hole 50 extending through the tubular section 48 of the wall 14. A lip seal 42 is provided around the push rod 16, and the wall 14 includes a lip seal support 52 having a surface thereof extending from and contiguous with the rear surface 34 of the wall 14, and having a second hole 54 for passage of the push rod 16.

While the embodiments of my invention disclosed herein are presently considered to be preferred, various changes and modifications can be made without departing from the spirit and scope of the invention. For example, the wall 14 may be laminated from two or more layers, or otherwise fabricated from multiple pieces. The term "wall," as used herein, is intended to include structures known in the automotive or vehicle manufacturing industry as "mod plates," "firewalls," "dashboards," and "mud guards."

The scope of the invention is indicated in the appended claims. We intend that all changes or modifications within the meaning and range of equivalents are embraced by the claims.

We claim:

1. An apparatus for mounting a brake booster on a wall, the booster having a push rod extending from a rear surface of the booster through a hole in the wall, the booster also having a breather port surrounding the push rod, the apparatus comprising:

a mounting surface of the wall disposed about the hole in the wall adapted for receiving the rear surface of the booster; and an air passage in the wall extending beneath the mounting surface for providing fluid communication from the breather port to air surrounding the booster when the rear surface of the booster is bearing against the mounting surface.

2. The apparatus of claim 1 wherein the wall includes a front and a rear surface thereof, with the mounting surface comprising a portion of the front side of the wall and the air passage comprising a channel in the wall, the channel having an inside surface thereof extending below and contiguous with the front surface of the wall.

3. The apparatus of claim 2 wherein the wall includes a recessed portion thereof forming a closed-ended tubular segment extending from the rear surface of the wall in a direction opposite from the mounting surface, and having an inner surface of the tubular segment contiguously connected to the front surface of the wall, and an outer surface of the tubular section contiguous with the outer surface of the wall, with the hole in the wall disposed in the closed end of tubular segment.

4. The apparatus of claim 3 wherein the recessed segment is adapted to receive a seal between the push rod and wall for resisting airflow through the hole.

5. The apparatus of claim 2 wherein the channel is provided by deforming a portion of the wall in a direction away from the booster, if the booster were mounted on the mounting surface.

6. The apparatus of claim 1 wherein: the wall includes a front and a rear surface thereof, with the mounting surface comprising a first portion of the front side of the wall including the hole and raised above a second portion of the front side of the wall; the first portion and second portions of the front side of the wall are connected contiguously by a tubular portion of the wall; and wherein the air passage is defined by a hole extending through the tubular section of the wall.

7. The apparatus of claim 6 further comprising a seal between the rear surface of the wall and the pushrod.

8. The apparatus of claim 1 further comprising a seal disposed between the push rod and the wall for resisting airflow through the wall via either the hole or the air passage.

9. An apparatus for mounting a brake booster on a wall including a front and a rear surface thereof and having a hole extending therethrough, the booster having a push rod extending from a rear surface of the booster through the hole in the wall, the booster also having a breather port surrounding the push rod, the apparatus comprising:

a mounting surface of the wall comprising a portion of the front side of the wall disposed about the hole in the wall adapted for receiving the rear surface of the booster;

an air passage in the wall adapted for providing fluid communication from the breather port to air surrounding the booster when the rear surface of the booster is bearing against the mounting surface;

the air passage comprising a channel in the wall, the channel having an inside surface thereof extending below and contiguous with the front surface of the wall; and a recessed portion of the wall forming a closed-ended tubular segment extending from the rear surface of the wall in a direction opposite from the mounting surface, and having an inner surface of the tubular segment contiguously connected to the front surface of the wall, and an outer surface of the tubular section contiguous with the outer surface of the wall, with the hole in the wall disposed in the closed end of the tubular segment, and the tubular recessed segment adapted for receiving a lip seal between the push rod and the wall for resisting airflow through the hole while providing for sliding movement of the pushrod through the seal.

10. An apparatus for mounting a brake booster on a wall including a front and a rear surface thereof and defining a hole therethrough, the booster having a push rod extending from a rear surface of the booster through the hole in the wall, the booster also having a breather port surrounding the push rod, the apparatus comprising:

a mounting surface of the wall disposed about the hole in the wall adapted for receiving the rear surface of the booster, with the mounting surface comprising a first portion of the front side of the wall including the hole and raised above a second portion of the front side of the wall;

a tubular portion of the wall contiguously connecting the first portion and second portions of the front side of the wall and defining an air passage hole extending through the tubular portion of the wall adapted for providing fluid communication from the breather port to air surrounding the booster when the rear surface of the booster is bearing against the mounting surface;

a lip seal support defined by the wall and having a surface thereof extending from and contiguous with the rear surface of the wall, and having a second hole for passage of the push rod; and a lip seal around the push rod between the rear surface of the wall and the pushrod.

11. A method for mounting a brake booster on a wall, where the booster has a push rod extending from a rear surface at the booster through a hole in the wall, and the booster also has a breather port surrounding the push rod, the method comprising:

adapting the wall to provide a mounting surface of the wall disposed about the hole in the wall for receiving the rear surface of the booster; and adapting the wall to provide an air passage extending beneath the mounting surface for fluid communication from the breather port to air surrounding the booster when the rear surface of the booster is bearing against the mounting surface.

12. The method of claim 11 further including adapting the wall to include a front and a rear surface thereof, with the mounting surface comprising a portion of the front side of the wall and the air passage comprising a channel in the wall, the channel having an inside surface thereof extending below and contiguous with the front surface of the wall.

13. The method of claim 12 further comprising adapting the wall to include a recessed portion thereof forming a closed-ended tubular segment extending from the rear surface of the wall in a direction opposite from the mounting surface, and having an inner surface of the tubular segment contiguously connected to the front surface of the wall, and an outer surface of the tubular section contiguous with the outer surface of the wall, with the hole in the wall disposed in the closed end of the tubular segment.

14. The method of claim 13 further comprising adapting the recessed area to receive a seal between the push rod and wall for resisting airflow through the hole.

15. The method of claim 12 comprising forming the channel by deforming a portion of the wall in a direction away from the booster, if the booster were mounted on the mounting surface.

16. The method of claim 11 wherein the wall includes a front and a rear surface thereof, and the method further comprises adapting the wall such that:

the mounting surface comprises a first portion of the front side of the wall including the hole and raised above a second portion of the front side of the wall;

the first portion and second portions of the front side of the wall are connected contiguously by a closed-ended tubular portion of the wall;

the air passage is defined by a hole extending through the tubular section of the wall; and the hole in the wall is located in the closed end of the tubular portion of the wall.

17. The method of claim 16 further comprising providing a seal between the rear surface of the wall and the pushrod.

18. The method of claim 11 further comprising sealing the push rod to the wall in a manner resisting airflow through the wall via either the hole or the air passage.

19. A method for mounting a brake booster on a wall including a front and a rear surface thereof and a hole in the wall, with the mounting surface, where the booster has a push rod extending from a rear surface of the booster through the hole in the wall, and the booster also has a breather port surrounding the push rod, the method comprising:

adapting the wall to provide a mounting surface of the wall comprising a portion of the front side of the wall disposed about the hole in the wall for receiving the rear surface of the booster;

adapting the wall to provide an air passage extending beneath the mounting surface for fluid communication from the breather port to air surrounding the booster when the rear surface of the booster is bearing against the mounting surface, the air passage comprising a channel in the wall, the channel having an inside surface thereof extending below and contiguous with the front surface of the wall;

adapting the wall to include a recessed portion thereof forming a closed-ended tubular segment extending from the rear surface of the wall in a direction opposite from the mounting surface, and having an inner surface of the tubular segment contiguously connected to the front surface of the wall, and an outer surface of the tubular section contiguous with the outer surface of the wall, with the hole in the wall disposed in the closed end of the tubular segment; and adapting the recessed portion of the wall to receive a lip seal between the push rod and wall for resisting airflow through the hole while allowing sliding movement of the pushrod through the lip seal.

20. A method for mounting a brake booster on a wall including a front and a rear surface thereof and a hole extending through the wall, where the booster has a push rod extending from a rear surface of the booster through the hole in the wall, and the booster also has a breather port surrounding the push rod, the method comprising:

adapting the wall to provide a mounting surface of the wall disposed about the hole in the wall for receiving the rear surface of the booster; and adapting the wall to provide an air passage extending beneath the mounting surface for fluid communication from the breather port to air surrounding the booster when the rear surface of the booster is bearing against the mounting surface;

adapting the wall such that the mounting surface comprises a first portion of the front side of the wall including the hole and raised above a second portion of the front side of the wall; the first portion and second portions of the front side of the wall are connected contiguously by a tubular portion of the wall, and wherein the air passage is defined by a hole extending through the tubular section of the wall;

providing a lip seal around the push rod between the rear surface of the wall and the pushrod; and adapting the wall to include a lip seal support having a surface thereof extending from and contiguous with the rear surface of the wall, and including a second hole in the wall for passage of the push rod.

* * * * *